(12) United States Patent
Boix et al.

(10) Patent No.: US 6,471,939 B1
(45) Date of Patent: Oct. 29, 2002

(54) SYNTHETIC POROUS CRYSTALLINE MATERIAL ITQ-12, ITS SYNTHESIS AND USE

(75) Inventors: Teresa Boix, Barcelona; Marta Puche, Valencia; Miguel A. Camblor, Zaragoza; Avelino Corma, Valencia, all of (ES)

(73) Assignee: ExxonMobil Research and Engineering Company, Annandle, NJ (US)

( * ) Notice: Subject to any disclaimer, the term of this patent is extended or adjusted under 35 U.S.C. 154(b) by 0 days.

(21) Appl. No.: 09/866,903

(22) Filed: May 29, 2001

(51) Int. Cl.[7] .................. C01B 39/48; C01B 37/02; C10G 1/00
(52) U.S. Cl. .................. 423/706; 423/708; 423/713; 423/718; 423/335; 208/46
(58) Field of Search .................. 423/706, 708, 423/713, 335; 208/46

(56) References Cited

U.S. PATENT DOCUMENTS

| | | | | |
|---|---|---|---|---|
| 3,972,983 A | * | 8/1976 | Ciric .................. | 423/705 |
| 4,211,760 A | * | 7/1980 | Grose et al. .................. | 423/713 |
| 4,483,835 A | * | 11/1984 | Zones .................. | 423/326 |
| 5,053,373 A | * | 10/1991 | Zones .................. | 423/706 |
| 6,254,849 B1 | * | 7/2001 | Lee et al. .................. | 423/706 |

* cited by examiner

*Primary Examiner*—David Sample
(74) *Attorney, Agent, or Firm*—Ronald D. Hantman

(57) ABSTRACT

A new synthetic porous crystalline material, designated ITQ-12, is disclosed having, in its calcined form, the X-ray diffraction pattern of Table 2 herein. Also disclosed are methods of making ITQ-12 in its silicate, aluminosilicate and borosilicate forms in the presence of HF using 1,3,5-trimethylimidazole as a directing agent and hydolyzed tetraethylorthosilicate as a silica source. ITQ-12 is useful in the conversion of methanol to olefins and as an adsorbent.

11 Claims, 4 Drawing Sheets

SYNTHETIC POROUS CRYSTALLINE MATERIAL ITQ-12, ITS SYNTHESIS AND USE

FIELD OF THE INVENTION

This invention relates to a novel synthetic porous crystalline material, ITQ-12, to a method for its preparation and to its use in catalytic conversion of organic compounds.

DESCRIPTION OF THE PRIOR ART

Zeolitic materials, both natural and synthetic, have been demonstrated in the past to have catalytic properties for various types of hydrocarbon conversion. Certain zeolitic materials are ordered, porous crystalline metallosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element and silicon atoms to oxygen atoms is 1:2. The electrovalence of the tetrahedra containing the Group IIIA element is balanced by the inclusion in the crystal of a cation, for example an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11(U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), merely to name a few.

Although most frequently encountered in aluminosilicate form, many zeolites are known in silicate and borosilicate forms. For example, silicalite is a silicate form of ZSM-5 and is disclosed in U.S. Pat. No. 4,061,724, whereas AMS-1B is a borosilicate form of ZSM-5 and is disclosed in U.S. Pat. No. 4,269,813. In addition, GB-A-2,024,790 discloses borosilicate forms of zeolite beta (boralite B), ZSM-5 (boralite C) and ZSM-11 (boralite D).

Many zeolites are synthesized in the presence of an organic directing agent, such as an organic nitrogen compound. For example, ZSM-5 may be synthesized in the presence of tetrapropylammonium cations and zeolite MCM-22 may be synthesized in the presence of hexamethyleneimine. It is also known from U.S. Pat. No. 5,785,947 that zeolite SSZ-32 can be synthesized in the presence of N,N'-diisopropylimidazolium hydroxide.

It is also known to use fluoride-containing compounds, such as hydrogen fluoride, as mineralizing agents in zeolite synthesis. For example, EP-A-337,479 discloses the use of hydrogen fluoride in water at low pH to mineralize silica in glass for the synthesis of ZSM-5.

SUMMARY OF THE INVENTION

The present invention is directed to a novel porous crystalline material, ITQ-12, having, in its calcined form, an X-ray diffraction pattern including values substantially as set forth in Table I below.

The invention further resides in a method for preparing ITQ-12 and in the conversion of organic compounds contacted with an active form of ITQ-12.

DESCRIPTION OF SPECIFIC EMBODIMENTS

Figure 1:
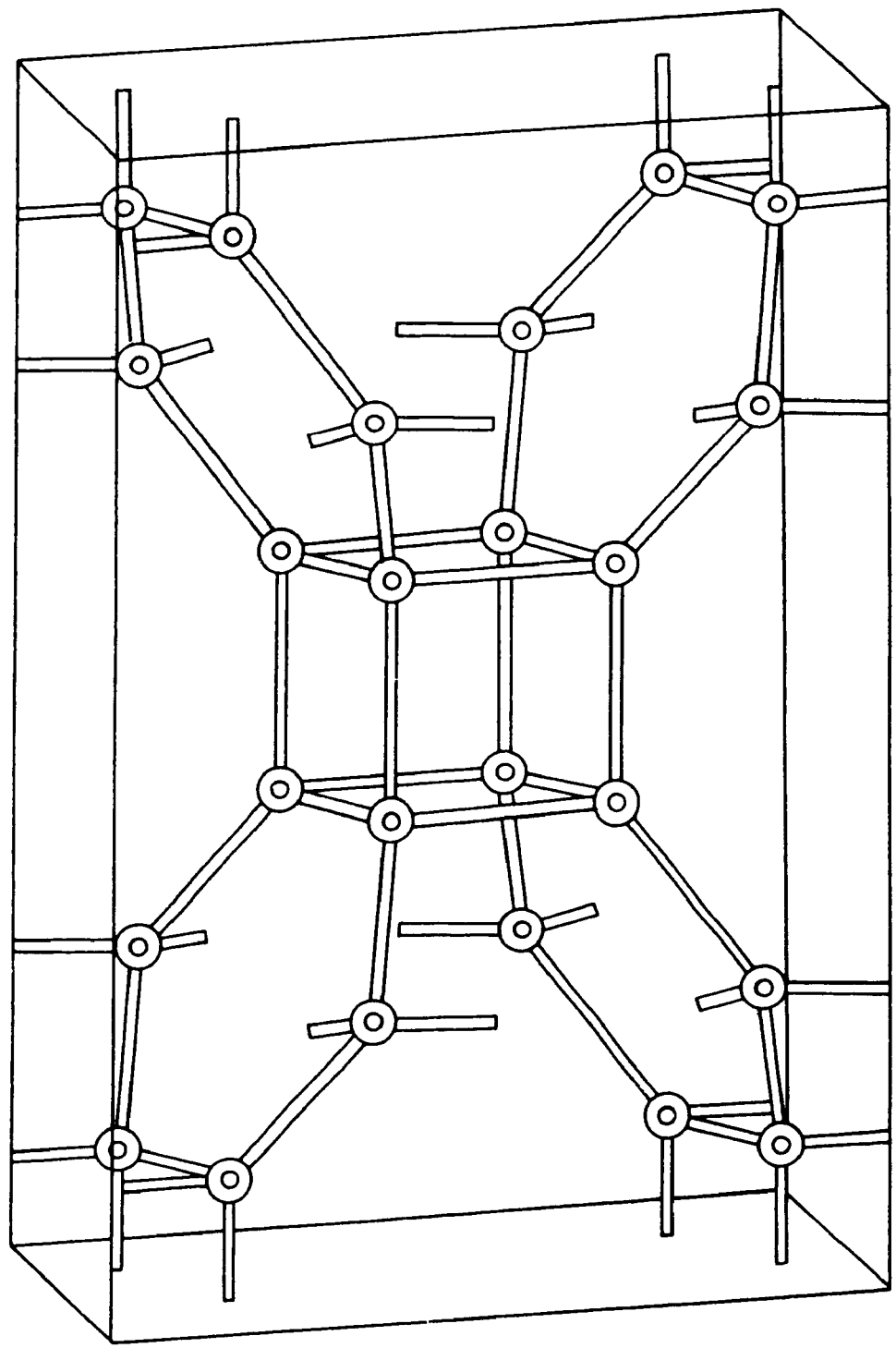
FIG. 1 is a schematic illustration of a unit cell of ITQ-12, showing the positions of the tetrahedral atoms
Figure 2:
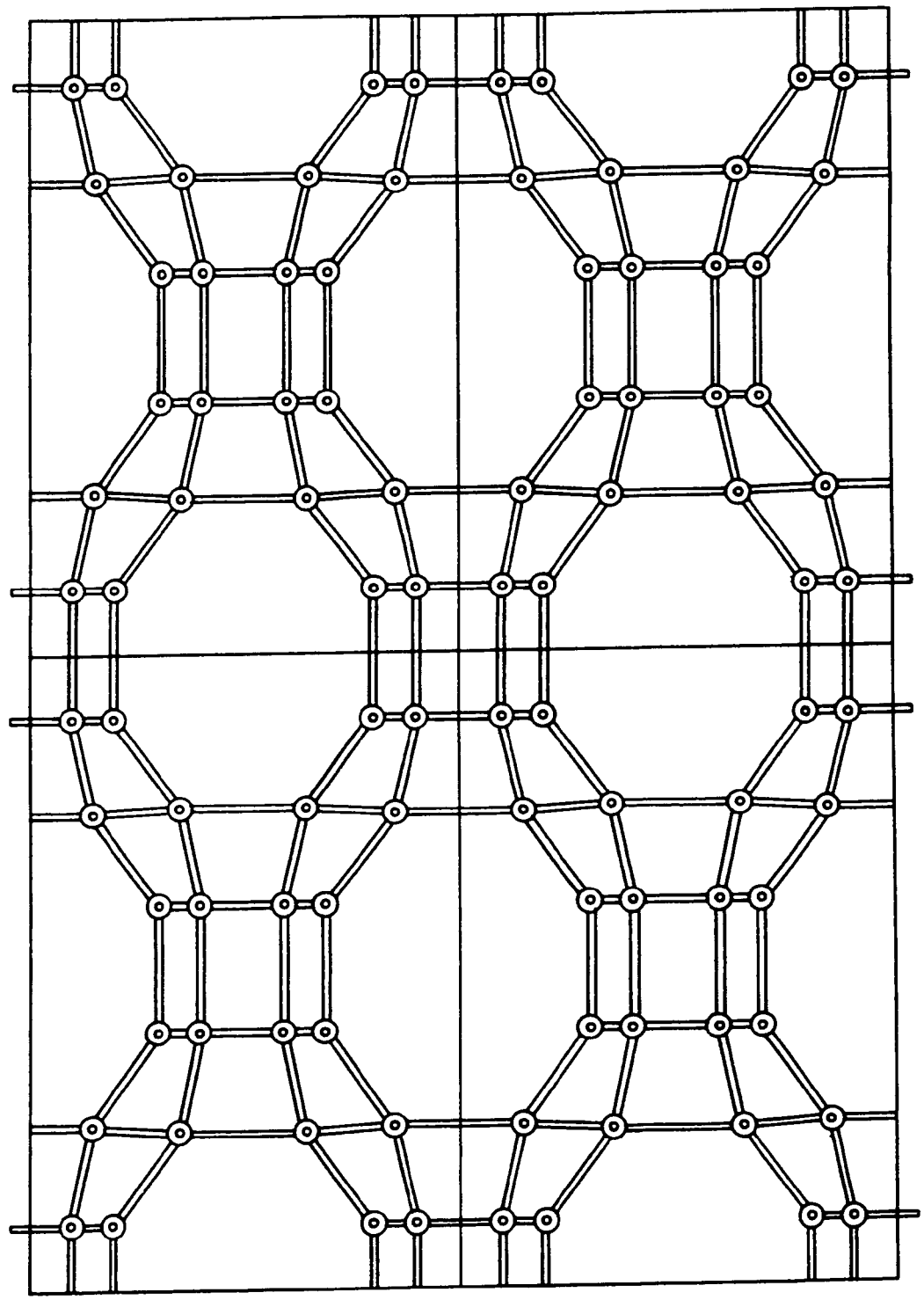
FIG. 2 is a schematic illustration of the channel system of ITQ-12, again showing the positions of the tetrahedral atoms.

The synthetic porous crystalline material of this invention, ITQ-12, is a single crystalline phase which has a 2-dimensional channel system comprising two sets of intersecting channels wherein each channel is defined by an 8-membered ring of tetrahedrally coordinated atoms. One set of 8-membered ring channels each has cross-sectional dimensions of about 3.4 Angstrom by about 4.6 Angstrom, whereas the other set of 8-membered ring channels each has cross-sectional dimensions of about 2.7 Angstrom by about 4.8 Angstrom.

The structure of ITQ-12 may be defined by its unit cell, which is the smallest structural unit containing all the structural elements of the material. Table 1 lists the positions of each tetrahedral atom in the unit cell in nanometers; each tetrahedral atom is bonded to an oxygen atom which is also bonded to an adjacent tetrahedral atom. Since the tetrahedral atoms may move about due to other crystal forces (presence of inorganic or organic species, for example), a range of ±0.05 nm is implied for each coordinate position.

TABLE 1

| | | | |
|---|---|---|---|
| T1 | 0.645 | 0.369 | 0.088 |
| T2 | 0.563 | 0.599 | 0.569 |
| T3 | 0.547 | 0.598 | 0.263 |
| T4 | 0.153 | 0.369 | 0.767 |
| T5 | 0.236 | 0.599 | 0.285 |
| T6 | 0.252 | 0.598 | 0.591 |
| T7 | 0.153 | 1.132 | 0.767 |
| T8 | 0.236 | 0.902 | 0.285 |

TABLE 1-continued

| | | | |
|---|---|---|---|
| T9 | 0.252 | 0.904 | 0.591 |
| T10 | 0.645 | 1.132 | 0.088 |
| T11 | 0.563 | 0.902 | 0.569 |
| T12 | 0.547 | 0.904 | 0.263 |
| T13 | 0.129 | 1.120 | 0.088 |
| T14 | 0.046 | 1.350 | 0.569 |
| T15 | 0.030 | 1.348 | 0.263 |
| T16 | 0.670 | 1.120 | 0.767 |
| T17 | 0.752 | 1.350 | 0.285 |
| T18 | 0.769 | 1.348 | 0.591 |
| T19 | 0.670 | 0.381 | 0.767 |
| T20 | 0.752 | 0.152 | 0.285 |
| T21 | 0.769 | 0.153 | 0.591 |
| T22 | 0.129 | 0.381 | 0.088 |
| T23 | 0.046 | 0.152 | 0.569 |
| T24 | 0.030 | 0.153 | 0.263 |

ITQ-12 can be prepared in essentially pure form with little or no detectable impurity crystal phases and has an X-ray diffraction pattern which is distinguished from the patterns of other known as-synthesized or thermally treated crystalline materials by the lines listed in Table 2 below.

TABLE 2

| d (Å) | Relative Intensities (I) |
|---|---|
| 8.31 ± 0.2 | m–vs |
| 6.75 ± 0.15 | vw–m |
| 5.63 ± 0.15 | s–vs |
| 4.98 ± 0.15 | vw–m |
| 4.26 ± 0.15 | w |
| 3.49 ± 0.1 | w |
| 3.44 ± 0.1 | m |

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacing, d's, were calculated in Angstrom units, and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (80–100), s=strong (60–80), m=medium (40–60), w=weak (20–40), and vw=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

The crystalline material of this invention has a composition involving the molar relationship:

$$X_2O_3:(n)YO_2,$$

wherein X is a trivalent element, such as aluminum, boron, iron, indium, and/or gallium, preferably boron; Y is a tetravalent element such as silicon, tin, titanium and/or germanium, preferably silicon; and n is at least 5, such as about 5 to ∞, and usually from about 40 to ∞. It will be appreciated from the permitted values for n that ITQ-12 can be synthesized in totally siliceous form in which the trivalent element X is absent or essentially absent.

Current processes for synthesizing ITQ-12 have employed fluorides, in particular HF, as a mineralizing agent and hence, in its as-synthesized form, ITQ-12 has a formula, on an anhydrous basis and in terms of moles of oxides per n moles of $YO_2$, as follows:

$$(0.4-0.7)R: X_2O_3:(n)YO_2:(0.4-0.7)F$$

wherein R is an organic moiety. The R and F components, which are associated with the material as a result of their presence during crystallization, are easily removed by post-crystallization methods hereinafter more particularly described.

The crystalline material of the invention is thermally stable and in the calcined form exhibits a high surface area and significant hydrocarbon sorption capacity.

To the extent desired and depending on the $X_2O_3/YO_2$ molar ratio of the material, any cations in the as-synthesized ITQ-12 can be replaced in accordance with techniques well known in the art by ion exchange with other cations. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

The crystalline material of the invention may be subjected to treatment to remove part or all of any organic constituent. This is conveniently effected by thermal treatment in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions.

The crystalline material of the invention can be intimately combined with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The crystalline material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the ITQ-12 in a vacuum, but a longer time is required to obtain a sufficient amount of dehydration.

The crystalline material of the invention can be prepared from a reaction mixture containing sources of water, optionally an oxide of trivalent element X, e.g., aluminum or boron, an oxide of tetravalent element Y, e.g., silicon, a directing agent (R) as described below and fluoride ions, said reaction mixture having a composition, in terms of mole ratios of oxides, within the following ranges:

| Reactants | Useful | Preferred |
|---|---|---|
| $YO_2/X_2O_3$ | at least 5 | At least 40 |
| $H_2O/YO_2$ | 2–50 | 5–20 |
| $OH^-/YO2$ | 0.1–1 | 0.4–0.8 |
| $F/YO_2$ | 0.1–1 | 0.4–0.8 |
| $R/YO_2$ | 0.1–1 | 0.4–0.8 |

The organic directing agent R used herein is the 1,3,5-trimethylimadazolium cation and preferably is 1,3,5-trimethylimadazole hydroxide. 1,3,5-Trimethylimadazole hydroxide can readily be prepared by methylation of commercially available 4- or 5-methylimadazole with methyl iodide followed by anion exchange of the resultant 1,3,5-trimethylimadazole iodide.

Crystallization of ITQ-12 can be carried out at either static or stirred conditions in a suitable reactor vessel, such as for example, polypropylene jars or teflon lined or stainless steel autoclaves, at a temperature of about 150° C. to about 200° C. for a time sufficient for crystallization to occur at the temperature used, e.g., from about 12 hours to about 30 days. Thereafter, the crystals are separated from the liquid and recovered.

It should be realized that the reaction mixture components can be supplied by more than one source. The reaction mixture can be prepared either batch-wise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material of this invention can be used as an adsorbent or, particularly in its aluminosilicate form, as a catalyst to catalyze a wide variety of chemical conversion processes including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity. An example of a reaction for which ITQ-12 is particularly suitable is the conversion of methanol to olefins and other chemicals at reaction conditions including a temperature of between about 500° F. and about 1000° F., a pressure from about 0.1 to 30 atmospheres and a weight hourly space velocity of between about 0.1 and about 30.

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

EXAMPLE 1

Preparation of 1,3,5-Trimethylimidazole Hydroxide.

11.5 g of 4(5)-methylimidazole (98%) and 45.36 g of $K_2CO_3$-1/2 $H_2O$ were suspended in 250 g of chloroform. 78 g of methyl iodide were added dropwise to the resultant slurry under continuous stirring and the mixture was stirred for 3–4 days at room temperature. A second addition of 78 g of methyl iodide was made, again under continuous stirring, and the mixture was stirred for a further 7 days. The solution was then recovered by filtration, washed with chloroform and rotary-evaporated until the solvent was completely removed. The resulting solid was washed with ether and vacuum dried. The elemental analysis and the $^1H^+$ NMR indicated that the solid was 1,3,5-trimethylimidazole iodide.

1,3,5-trimethylimidazole hydroxide was prepared by direct anionic exchange from the iodide using a resin, Dowex (Sigma), as the hydroxide source, the resin having been washed with distilled water prior to use until the water was at a pH of 7. The procedure involved dissolving 31.10 g of 1,3,5-trimethylimidazole iodide in 75 gal distilled water and contacting the resulting solution with 150 g of Dowex resin for 12 hours under mechanical stirring. After filtration and washing the resin with the least amount of water to recover Is most of the 1,3,5-trimethylimidazole hydroxide, the solution was rotary-evaporated at 50° C. for 1 hour. Titration with 0.1 N hydrochloric acid showed the trimethylimidazole hydroxide concentration of the final solution to be about $10^{-3}$ mol/g of solution.

EXAMPLE 2

Synthesis of Purely Siliceous ITQ-12

The synthesis gel used for the synthesis had the following molar composition:

1 SiO2: 0.56 R(OH): 0.56 HF: 7 H$_2$O where R(OH) is 1,3,5-trimethylimidazole hydroxide.

Figure 3:
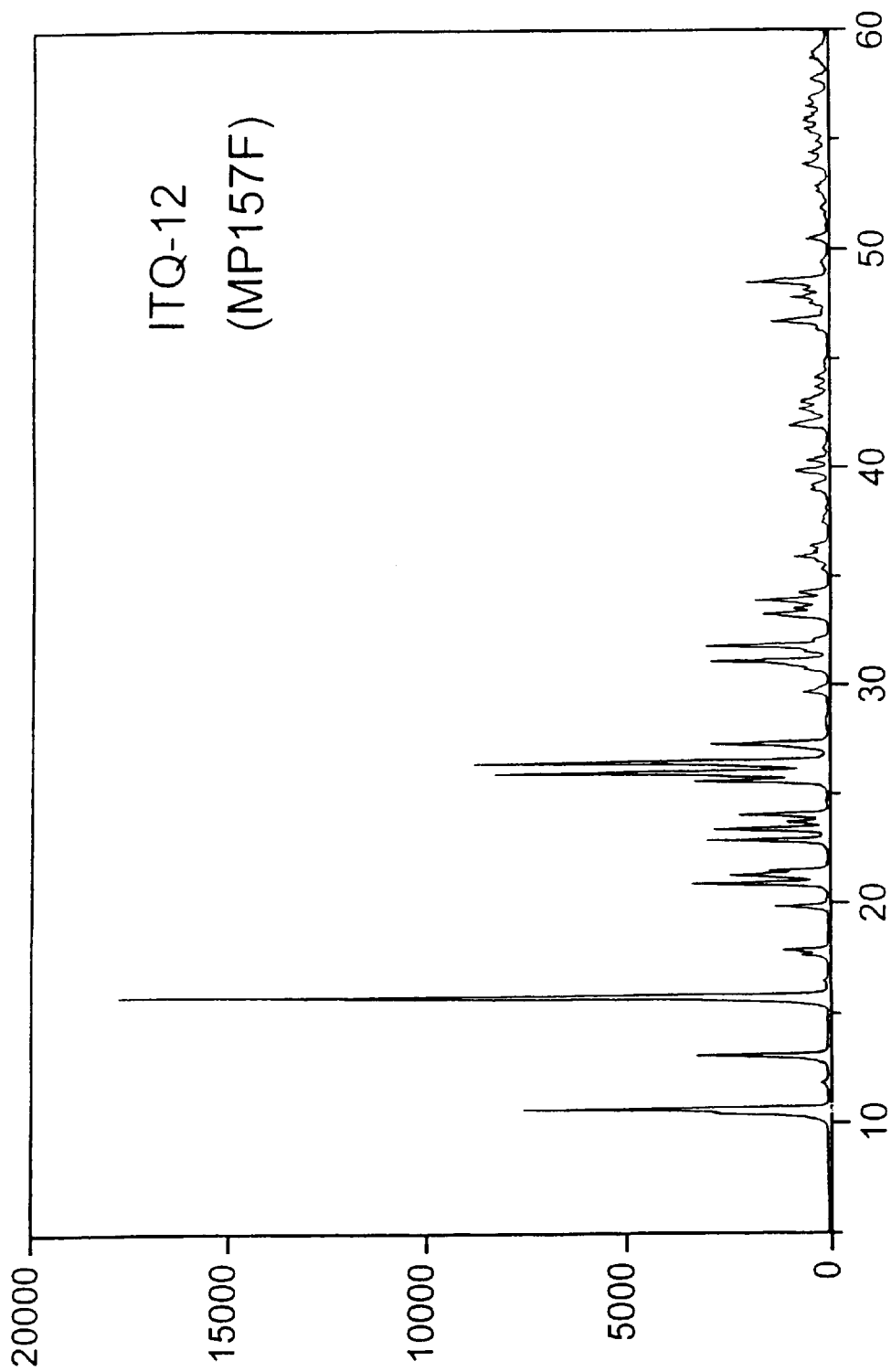
FIG. 3 shows the X-ray diffraction pattern of the as-synthesized product of Example 2.
Figure 4:
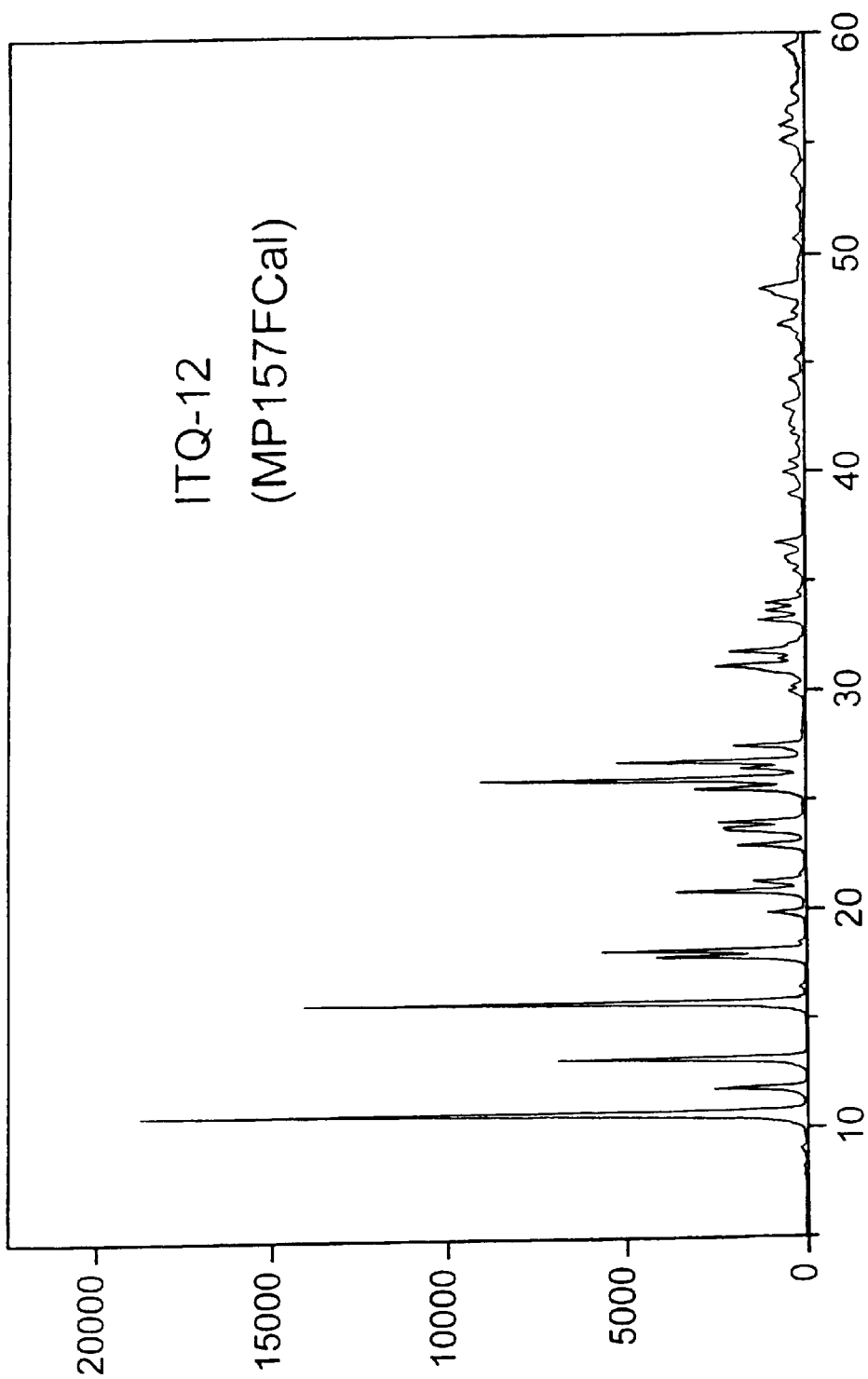
FIG. 4 shows the X-ray diffraction pattern of the as-calcined product of Example 2.

The synthesis gel was produced by hydrolyzing 20.83 g of tetraethylorthosilicate (TEOS) in 55.54 g of the 1,3,5-trimethylimidazole hydroxide solution produced in Example 1 under continuous mechanical stirring at 200 rpm until the ethanol and an appropriate amount of water were evaporated to yield the above gel mixture. Then, a solution of 2.33 g of HF (48 wt % in water) and 1 g of water was slowly dropped to the 1,3,5-trimethylimidazole silicate solution. The resultant mixture was mechanically and finally manually stirred until a homogeneous gel was formed. The resulting gel was very thick as a consequence of the small amount of water present. The gel was autoclaved at 175° C. for 13 days under continuous stirring at 60 rpm. The pH of the final gel (prior to filtration) was 8.3–8.6. The solid product, the novel crystalline material ITQ-12, was recovered by filtration, washed with distilled water and dried at 100° C. overnight. The occluded 1,3,5-trimethylimidazole and fluoride ions were removed by calcination at 650° C. in air for 10 hours. X-ray diffraction analysis of the as-synthesized and calcined samples gave the results listed in Tables 3 and 4, respectively and shown in FIGS. 3 and 4, respectively.

TABLE 3

| $d_{hkl}$ (Å) | 100 $I_o/I_{max}$ |
| --- | --- |
| 8.48 | 20 |
| 8.33 | 40 |
| 6.77 | 18 |
| 5.62 | 100 |
| 4.97 | 10 |
| 4.48 | 10 |
| 4.25 | 20 |
| 4.18 | 15 |
| 4.14 | 10 |
| 3.89 | 15 |
| 3.88 | 10 |
| 3.80 | 15 |
| 3.75 | 5 |
| 3.70 | 15 |

TABLE 3-continued

| $d_{hkl}$ (Å) | 100 $I_o/I_{max}$ |
| --- | --- |
| 3.48 | 20 |
| 3.43 | 45 |
| 3.37 | 50 |
| 3.36 | 25 |
| 3.27 | 15 |
| 3.26 | 10 |
| 2.89 | 5 |
| 2.87 | 15 |
| 2.86 | 10 |
| 2.81 | 20 |
| 2.80 | 10 |
| 2.78 | 10 |
| 2.70 | 5 |
| 2.69 | 10 |
| 2.67 | 5 |
| 2.64 | 10 |
| 2.63 | 5 |
| 2.50 | 5 |
| 1.87 | 10 |

TABLE 4

| $d_{hkl}$ (Å) | 100 $I_o/I_{max}$ |
| --- | --- |
| 8.28 | 100 |
| 7.50 | 15 |
| 6.73 | 40 |
| 5.63 | 80 |
| 4.99 | 25 |
| 4.90 | 30 |
| 4.46 | 5 |
| 4.27 | 20 |
| 4.19 | 5 |
| 4.16 | 10 |
| 3.87 | 10 |
| 3.77 | 10 |
| 3.75 | 10 |
| 3.71 | 15 |
| 3.50 | 20 |
| 3.44 | 50 |
| 3.37 | 10 |
| 3.33 | 30 |
| 3.24 | 10 |
| 2.87 | 15 |
| 2.82 | 10 |
| 2.70 | 10 |
| 2.66 | 5 |
| 2.63 | 5 |
| 2.44 | 5 |
| 1.89 | 5 |
| 2.405 | 5.0 |

EXAMPLE 3

Synthesis of Purely Siliceous ITQ-12

The process of Example 2 was repeated with the varying water/silica molar ratios and crystallization times listed in Table 5 below but with all other parameters remaining unchanged. In each case the synthesis yielded the novel crystalline material ITQ-12.

TABLE 5

| Water/Silica | Crystallization time (days) |
| --- | --- |
| 3,4 | 5 |
| 3,4 | 7 |
| 3,4 | 9 |

TABLE 5-continued

| Water/Silica | Crystallization time (days) |
|---|---|
| 4 | 12 |
| 7 | 13 |

EXAMPLE 4

Synthesis of Purely Siliceous ITQ-12

The process of Example 1 was again repeated with the varying water/silica molar ratios, crystallization temperatures and crystallization times listed in Table 6 below but with all other parameters remaining unchanged. In each case the synthesis yielded the novel crystalline material ITQ-12.

TABLE 6

| Water/Silica | Crystallization time (days) | Crystallization Temperature, °C. |
|---|---|---|
| 15 | 36 | 135 |
| 15 | 49 | 135 |
| 4 | 20 | 150 |
| 4 | 18 | 135 |
| 4 | 40 | 135 |
| 4 | 7 | 150 |
| 4 | 9 | 150 |

EXAMPLE 5

Synthesis of Borosilicate ITQ-12

The synthesis gel used for this synthesis had the following molar composition:

1 $SiO_2$: 0.02 $B_2O_3$: 0.60 R(OH) 0.72 HF: 8$H_2O$ where R(OH) is 1,3,5-trimethylimidazole hydroxide and 4 wt % of the $SiO_2$ was added as ITQ-12 seeds.

The synthesis gel was produced by hydrolyzing 9.71 g of TEOS in 21 81 g of the 1,3,5-trimethylimidazole hydroxide solution produced in Example 1 and which also contained 0.1 15 g of boric acid. The hydrolysis was effected under continuous mechanical stirring at 200 rpm, until the ethanol and the appropriate amount of water were evaporated to yield the above gel reaction mixture. After the hydrolysis step, a solution of 1146 g of HF (48 wt % in water) and 0.33 g of water was slowly added to 2.29 g of the 1,3,5-trimethylimidazole silicate solution formed. Then, a suspension of 0.04 g of as-prepared ITQ-12 in 0.76 g of water was added as seeds to accelerate the subsequent crystallization step. The reaction mixture was mechanically and finally manually stirred until a homogeneous gel is formed. The resulting gel was very thick as a consequence of the small amount of water present. The gel was autoclaved at 175° C. for 5 days under continuous stirring at 60 rpm. The pH of the final gel (prior to filtration) was 7.5–7.8. The solid was recovered by filtration, washed with distilled water and dried at 100° C., overnight. The occluded 1,3,5-trimethylimidazole and fluoride ions were removed by calcination at 650° C. in air for 10 hours. X-ray diffraction analysis of the calcined and as-synthesized samples gave the results summarized in Tables 3 and 4 respectively and showed the product to be pure ITQ-12. Boron analysis gave a Si/B atomic ratio of 200 for the final product.

Similar results were obtained when the crystallization time was extended to 8 and 14 days.

EXAMPLE 6

Synthesis of Borosilicate ITQ-12

The process of Example 5 was repeated but with the synthesis gel having the following molar composition:

1 $SiO_2$: 0.005 $B_2O_3$: 0.57 R(OH) 0.61 HF: 7$H_2O$ where R(OH) is 1,3,5-trimethylimidazole hydroxide and 4 wt % of the $SiO_2$ was added as ITQ-12 seeds. Crystallization was conducted at 175° C. for various times between 5 and 14 days and gave ITQ-12 products with Si/B atomic ratios varying between 296 and 357.

EXAMPLE 7

Synthesis of Borosilicate ITQ-12

The process of Example 5 was repeated but with the synthesis gel having the following molar composition:

1 $SiO_2$: 0.01 $B_2O_3$: 0.58 R(OH) 0.65 HF: 7$H_2O$ where R(OH) is 1,3,5-trimethylimidazole hydroxide and 4 wt % of the $SiO_2$ was added as ITQ-12 seeds. Crystallization was conducted at 175° C. for 5 and 9 days and gave ITQ-12 products with Si/B atomic ratios of 258 and 254 respectively.

EXAMPLE 8

Synthesis of Aluminosilicate ITQ-12

The synthesis gel used for this synthesis had the following molar composition:

1 $SiO_2$: 0.005 $Al_2O_3$: 0.57 R(OH) 0.61 HF: 5.3 $H_2O$ where R(OH) is 1,3,5-trimethylimidazole hydroxide and 4 wt % of the SiO2 was added as ITQ-12 seeds.

The synthesis gel was produced by hydrolyzing 10.42 g of TEOS in 29.04 g of the 1,3,5-trimethylimidazole hydroxide solution produced in Example 1 and which also contained 0.0135 g of metallic aluminum. The hydrolysis was effected under continuous mechanical stirring at 200 rpm, until the ethanol and the appropriate amount of water were evaporated to yield the above gel reaction mixture. After the hydrolysis step, a solution of 0.32 g of HF (48 wt % in water) and 0.41 g of water was slowly added to 220 g of the 1,3,5-trimethylimidazole silicate solution formed. Then, a suspension of 0.04 g of as-prepared ITQ-12 in 0.73 g of water was added as seeds and the resultant mixture was mechanically and finally manually stirred until a homogeneous gel is formed. The resulting gel was very thick as a result of the small amount of water present. The gel was autoclaved at 175° C. for 5 days under continuous stirring at 60 rpm. The pH of the final gel (prior to titration) was 7.5–7.8. The solid was recovered by filtration, washed with distilled water and dried at 100° C., overnight. The occluded 1,3,5-trimethylimidazol and fluoride ions were removed by calcining at 650° C. in air for 10 hours. X-ray diffraction analysis of the calcined and as-synthesized samples showed the product to be pure ITQ-12 and aluminum analysis gave a Si/Al atomic ratio of 188 for the final product.

Similar results were obtained when the crystallization time was extended to 7 and 14 days.

EXAMPLE 9

Synthesis of Aluminosilicate ITQ-12

The process of Example 8 was repeated but with the synthesis gel having the following molar composition:

1 SiO2: 0.01 Al$_2$O$_3$: 0.58 R(OH) 0.65 HF: 7H$_2$O where R(OH) is 1,3,5-trimethylimidazole hydroxide and 4 wt % of the SiO$_2$ was added as ITQ-12 seeds. Crystallization was conducted at 175° C. for 7 days and gave ITQ-12 products with a Si/Al atomic ratio of 182.

What is claimed is:

1. A synthetic porous crystalline material comprising a framework of tetrahedral atoms bridged by oxygen atoms, the tetrahedral atom framework being defined by a unit cell with atomic coordinates in nanometers shown in Table 1, wherein each coordinate position may vary within ±0.05 nanometer.

2. A synthetic porous crystalline material characterized by an X-ray diffraction pattern including values substantially as set forth in Table 2 of the specification.

3. The crystalline material of claim 2 having a composition comprising the molar relationship X$_2$O$_3$:(n)YO$_2$, wherein n is at least 5, X is a trivalent element, and Y is a tetravalent element.

4. The crystalline material of claim 3 having a composition, on an anhydrous basis and in terms of moles of oxides per n moles of YO$_2$, expressed by the formula:

(0.4–0.7)R:X$_2$O$_3$:(n)YO$_2$:(0.4–0.7)F wherein R is an organic moiety.

5. The crystalline material of claim 4 wherein said R comprises a 1,3,5-trimethylimadazolium cation.

6. The crystalline material of claim 3 wherein X is a trivalent element selected from the group consisting of boron, iron, indium, gallium, aluminum, and a combination thereof; and Y is a tetravalent element selected from the group consisting of silicon, tin, titanium, germanium, and a combination thereof.

7. The crystalline material of claim 3 wherein X comprises boron or aluminum and Y comprises silicon.

8. A siliceous form of the crystalline material of claim 3.

9. A method for synthesizing the crystalline material of claim 2 which comprises (i) preparing a mixture capable of forming said material, said mixture comprising sources of water, optionally an oxide of trivalent element X, an oxide of tetravalent element Y, a directing agent (R) and fluoride ions, wherein R is a 1,3,5-trimethylimadazolium cation, said reaction mixture having a composition, in terms of mole ratios of oxides, within the following ranges:

| | |
|---|---|
| YO$_2$/X$_2$O$_3$ | at least 5 |
| H$_2$O/YO$_2$ | 2–50 |
| OH$^-$/YO$_2$ | 0.1–1 |
| F/YO$_2$ | 0.1–1 |
| R/YO$_2$ | 0.1–1 |

(ii) maintaining said mixture under sufficient conditions including a temperature of from about 150° C. to about 200° C. until crystals of said material are formed; and (iii) recovering said crystalline material from step (ii).

10. The method of claim 9 wherein the mixture has a composition, in terms of mole ratios, within the following ranges:

| | |
|---|---|
| YO$_2$/X$_2$O$_3$ | at least 5 |
| YO$_2$/X$_2$O$_3$ | at least 40 |
| H$_2$O/YO$_2$ | 5–20 |
| OH$^-$/YO$_2$ | 0.4–0.8 |
| F/YO$_2$ | 0.4–0.8 |
| R/YO$_2$ | 0.4–0.8. |

11. A process for converting a feedstock comprising organic compounds to conversion product which comprises contacting said feedstock at organic compound conversion conditions with a catalyst comprising an active form of the synthetic porous crystalline material of claim 2.

* * * * *